Jan. 7, 1964  M. KAHN ETAL  3,117,177
MULTI-LAYER POLARIZERS EMPLOYING GLASS
FLAKE AND BEAD MATERIALS
Filed May 31, 1960  2 Sheets-Sheet 1
FIG. 1
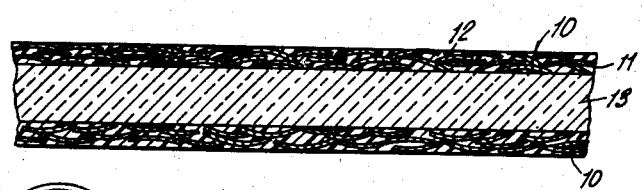
FIG. 2
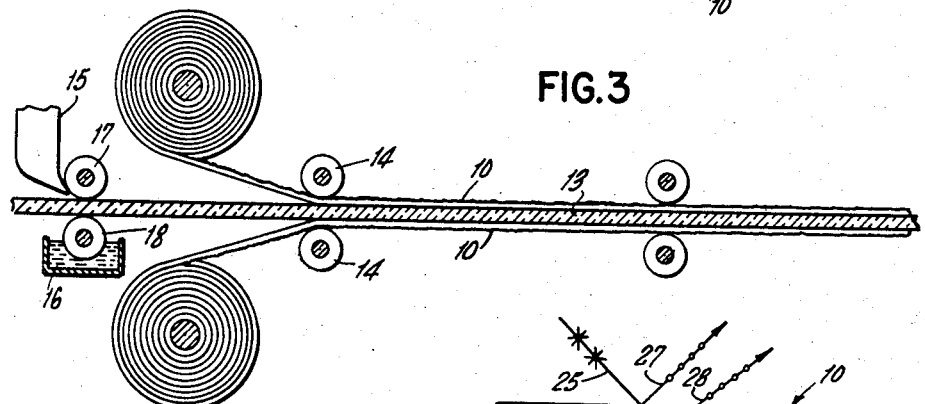
FIG. 3
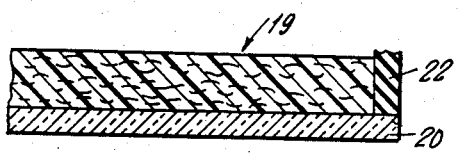
FIG. 4
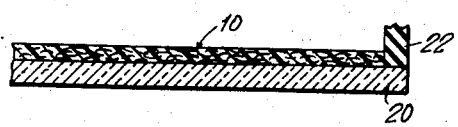
FIG. 5
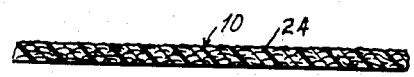
FIG. 6
FIG. 7
INVENTORS.
MYRON KAHN
ALVIN M. MARKS
MORTIMER M. MARKS
BY Albert F. Kronman
ATTORNEY

INVENTORS.
MYRON KAHN
ALVIN M. MARKS
MORTIMER M. MARKS

ATTORNEY

United States Patent Office 3,117,177
Patented Jan. 7, 1964

3,117,177
MULTI-LAYER POLARIZERS EMPLOYING GLASS
FLAKE AND BEAD MATERIALS
Myron Kahn, Alvin M. Marks, and Mortimer M. Marks,
Whitestone, N.Y., assignors, by mesne assignments, to
said Alvin M. Marks and said Mortimer M. Marks
Filed May 31, 1960, Ser. No. 32,877
3 Claims. (Cl. 88—65)

This invention relates to a structure capable of polarizing light incident thereon by reflection and refraction. This application is a continuation-in-part of our co-pending application Serial No. 626,025 filed December 3, 1956, now Patent No. 3,024,701, issued March 13, 1962, for Flake Glass Panel Structures.

It has long been known that light incident upon a pile of plates at specific angles, known in the art as Brewster's angle, will emerge from said plates as polarized light. The unpolarized component will be reflected or internally absorbed by the glass plates. It is also known to prepare panels for transforming randomly vibrating light into polarized light, which panels consist of a large number of layers of transparent material interspersed with air spaces, gas spaces, or the like. Previously known articles have been fairly thick in cross section, because of the large numbers of layers of light transmitting material or flakes of glass separated by air spaces which were required in order to achieve a satisfactory result.

Accordingly, it is an object of the present invention to provide an extremely thin multi-layered flake structure capable of transmitting a high percentage of the light incident thereon as polarized light.

Another object of the present invention is to provide a multi-layered flake structure which will be free of air spaces or voids.

Still another object of the present invention is to provide a flexible multi-layered polarizing film to be attached to or incorporated in the surfaces of other light transparent structures.

A further object of the present invention is to provide a light polarizing sheet or film having only one-half the necessary number of layers to produce satisfactory polarization and to use the said sheet in conjunction with a similar second sheet to complete the highly efficient light polarizing structure. An object of the present invention is to provide a light polarizing sheet or film which will lend itself to a wide variety of manufacturing techniques and light transmitting products.

Still another object of the present invention is to provide a light polarizing film having a coating of pressure sensitive adhesive on one side thereof for ready application to transparent supporting members.

A further object of the invention is to provide a light polarizing film, which will have greater resistance to the effects of weathering than present reinforced plastics.

Another feature of the present invention is the use of relatively few layers of high index glass flakes to achieve a high percentage of polarizing efficiency.

Still another feature of the present invention is its laminated construction whereby the finished light polarizing panel structure will not warp.

A further object of the present invention is to provide a light polarizing film which will reflect heat and transmit polarized light.

A further feature of the present invention is the flexibility of the light polarizing sheets or films which lends itself to easy transportation and application to all manner of surfaces.

A feature of the present invention is the use of roughened or prismatic entrance and exit surfaces on the light polarizing sheets to improve the polarizing efficiency.

Another feature of the present invention is its use of small glass beads of high index of refraction to improve the polarizing efficiency of the polarizing sheet.

The invention consists of the construction, combination, and arrangement of parts as herein described and claimed.

In the accompanying drawings forming part hereof are illustrated several forms of embodiment of the invention in which drawings similar reference characters designate corresponding parts, and in which:

FIGURE 1 is a fragmentary cross-sectional view of a light polarizing film made in accordance with the present invention, greatly enlarged.

FIGURE 2 is a fragmentary cross-sectional view of a laminated light polarizing panel, greatly enlarged, another embodiment of the present invention.

FIGURE 3 is a somewhat diagrammatic view showing a manner in which the laminated structure in FIGURE 2 may be assembled.

FIGURE 4 is a somewhat diagrammatic view showing the path of rays of light through the multi-layer polarizer whereby only the desired radially polarized light will be transmitted by the panel.

FIGURE 5 is a fragmentary cross-sectional view of a mold showing a thinned monomer and glass flake mixed or cast therein at the initial stage of the manufacture of a light polarizing film in accordance with the present invention.

FIGURE 6 is a view similar to FIGURE 5 showing the deposition and orientation of the glass flake within a mold.

FIGURE 7 is a cross-sectional view of the light polarizing film made by the apparatus of FIGURES 5 and 6.

Figure 8:
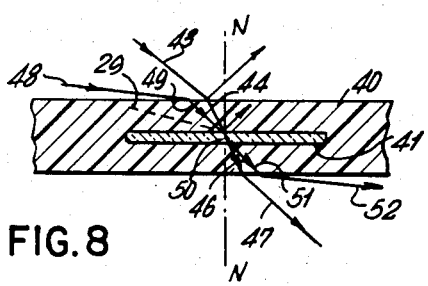
FIGURE 8 is a fragmentary cross-sectional view greatly enlarged of a transparent medium having a high index glass particle imbedded therein, showing the various light paths therethrough.

Referring to the drawings and specifically to FIGURE 1, 10 indicates a film or thin sheet of material formed of a plurality of small flakes of glass 11 embedded or bound together by a suitable material 12 which is transparent and has a low index of refraction. The structure shown in FIGURE 1 is made up of approximately six to twenty layers of glass flake 11 disposed in substantially parallel alignment but in random orientation throughout the film 10. However, it has been found that from two to twenty layers of glass flakes so oriented will produce highly satisfactory light polarizing results.

The glass flakes 11 used in the structures of FIGURES 1, 2 and 3 preferably can have refractive index of from 2.21 and preferably 2.25 or higher. The manufacture of such glass has been taught, for example, in United States Patent No. 2,790,723. High index flakes 11 suitable for the present purposes may be substantially flat and of approximately 2 microns to 25 in thickness with a diameter of between 175 microns and up to 3 millimeters. With a thickness of about 2 microns it is desirable that the flakes should not be less than 50 microns in diameter, in order to assure layer like disposition.

The material 12 which binds the glass flakes together may be any suitable transparent material having a low refractive index and in which the flakes can be incorporated. The material may be an acrylic monomer, polethylene, cellulose acetate, or other organic resins or a low refractive index glass. Suitable silicones or transparent epoxies may also be used. The index of refraction of the binding material should be no higher than 1.5 and preferably between 1.5 and 1.36. The lower index of refraction is preferable. Materials having still lower index of refraction may be used advantageously.

Further plastic materials in which the glass flakes may be embedded may be selected from cellulose acetate having a refractive index of 1.47 to 1.50, ethyl-cellulose of refractive index 1.47, cellulose acetate butyrate of refractive index 1.47, Butysite having a refractive index of 1.49 and which is a form of polyvinyl butyrate.

A very low index of refraction for the supporting medium may be achieved using, for example, polyvinyl fluoride, refractive index 1.46, a co-polymer of Tetrafluoroethylene and Hexafluoropropylene, having a refractive index of 1.37, or polychlorotrifluoroethylene, refractive index 1.43.

For the purposes of this invention suitable transparent flakes may be prepared from the oxides of the heavier metals, such as lead, rare earth oxides, titanium dioxide and the like. These glasses usually have a high density of the order of three to five. Alternative materials are glass flakes coated with suitable high index transparent material such as titanium dioxide, or zinc sulphide in a thickness of about $\frac{1}{200,000}$ of an inch. The high index glass flakes may be mixed into a thinned monomer such as methylmethacrylate with or without known plasticizers to produce flexible or rigid sheets, and the like, and cast to form a clear sheet in the manner well known in the art of casting monomers. In addition to methylmethacrylate, many of the plastic materials hereinabove set forth may be used. The monomer has a density of about 1.0 and the polymer formed therefrom has an index of refraction of 1.50 or less. If high index flakes 11 are added in the desired proportion of from 3% to no more than 10% by weight and the monomer mixed in a casting mold or tank 19 (see FIGURES 5, 6 and 7) having a flat bottom 20 and sides 22, the high index, high density flake will settle evenly to the bottom of the mold 19. A thin deposit consisting of compact layers of flake horizontally disposed in parallel alignment will form upon the bottom 20 of the mold 19. This stage of the deposition can be seen in FIGURE 6. As few as four layers of such flake may be used for producing the polarizing efficiency of present thick multi-layer flake glass polarized panels, because of the very high relative index of refraction with such flakes.

After the flakes have settled and before the monomer has polymerized the excess monomer is drained off leaving only enough monomer to cover the topmost layer of flakes, thus leaving both the upper surface and the lower or bottom surface covered equally by the monomer to the same extent, with the flakes evenly disposed in between. The monomer or plastic is then polymerized and the resulting unitary structure shown in FIGURE 7 is a flat sheet or film which will not be warped.

The structure in FIGURE 2 shows a film 10 bonded on each side of a transparent support member 13. Between 2 to 10 layers of said glass flake may be embedded within each of the films 10 and the total of both films will produce a percentage of polarization of from 40% to 80% or more. The transparent or translucent support 13 may be of any of the well known plastics such as acrylic, vinyl, styrene, acetate, fiberglass reinforced plastics or glass or the like.

Referring to FIGURE 3 it will be seen that the structure of FIGURE 2 may be assembled by positioning two rolls of the polarizing film 10 on each side of the transparent support 13 and thereafter feeding the films 10 and the support structure 13 through the rollers 14 to form the laminated sheet. The lamination may be completed prior to the final curing of the support 13 in order that the films 10 and the support 13 may be cured into a solid integral structure. Adhesives may be applied to the surfaces of the support structure 13 from the containers 15, 16 and the dispensing wheels 17, 18 which ride upon the bottom and top surfaces of the supporting member 13. The rollers 14 serve to compress the lamination and complete the incorporation of the films 10 into or onto the surface of the structure 13, as it travels therebetween. The polarizing film provided with a pressure sensitive adhesive on one of its surfaces may be applied to the surfaces of the support 13.

The polarizing sheet structure, despite the enlarged drawings, is unitary, free of air spaces and substantially thinner than any previously known multi-layer polarizing product, while at the same time achieving a high degree of polarizing efficiency. In addition, by reason of the fact that few layers of high index glass flakes alternating with a low index transparent material are contained in said very thin film or sheet and that this film 10 imparts to the support 13 of the property of polarization resulting from the structures being laminated together the total strucure will be uniform in appearance.

The sharp difference in the refractive index between the flakes 11 and the plastic binder 12 results in a substantial percentage of the light incident upon the sheet being transmitted as polarized light.

It is within the purview of the present invention to use four layers of flake within the binding material and to thereafter laminate this film structure to each side of a transparent or translucent supporting structure 13, to form a highly efficient polarizing light transmitting panel.

The finished film consists of a thin layer with high index glass flake or glass flake coated with a high index transparent material, embedded within said film material which is transparent and of a low refractive index and the combination forms a unitary structure without internal air spaces or voids therein.

The sheet shown in FIGURE 7 may also be provided with a light depolarizing surface 24 on the top thereof. The light depolarizing surface 24 will insure that the light entering the sheet will be randomized or that the light reflected back through the surface 24 will be depolarized.

In addition to the foregoing method of casting light polarizing sheets or films it is possible to continuously cast very thin films of monomeric or other suitable low index materials having said high index glass flakes mixed therein, in very thin film having between two to twenty layers of glass flakes disposed in parallel alignment but randomly oriented within the low index material. The glass flakes may be aligned either prior to its deposition within the binder or after its placement within the binding material by means of vibrators, centrifuges, electrostatic apparatus or other devices well known in the art of handling small particles of material.

All of the films should be cast from plastics in the solvent state and the finished film should be in the thickness of approximately 1 to 5 thousandths of an inch and the finished film may be either flexible or semi-rigid. Films cast in this manner can be easily rolled, shipped or stored and can also be cut into the desired sizes, widths and shapes and conformed to the contours of the light transmitting articles to which they are to be applied such as fiberglass reinforced plastic panels, plastic or glass sheeting or other structural light transmitting products.

In addition to the polarizing efficiency provided by the embodiments, laminated or incorporated, as shown in FIGURE 2, the polarizing film contributes additional surface structural improvement characteristics to the panel to which it is applied. The glass flake contributes greater rigidity to the panel particularly if applied as shown to the outer layers. By reason of the use of two outer surface layers which have an equal coefficient of expansion, being applied to both sides of the inner structure 13, prior to final curing, said panel will remain flat even though exposed to heat in final curing, and will not warp. Flatness is important where structural requirements and appearance are concerned. When a single surface of the structure 13 is laminated to a single film 10 prior to final curing, the difference in the coefficient of expansion between the film and the structure to which it is laminated on just one side results in a warping of the final laminated structure after it has been cured. It is within the purview of the present invention to apply a pressure sensitive adhesive layer to one or both sides of the light polarizing structure made in accordance with the present invention. Thus, for example, one surface of the structure 10 may be coated with a pressure sensitive adhesive and a protective foil (not shown) applied thereover. When it is desired to use the structure the protective foil may be stripped from the pressure sensitive adhesive in the well known manner and the light polarizing structure attached to a transparent supporting member 13. In this manner, light polarizing film can be attached to conventional windows, skylights, lamps, or the like. The film 10 is extremely thin, easily folded and handled, shipped, cut, incorporated with other light transmitting structures, and requires minimum amounts of raw materials.

A plurality of films each having 2 to 10 layers of glass flakes embedded therein, may be built up to increase the polarizing characteristics of the panel for specific applications if desired.

The principle upon which the multi-layer polarizers disclosed herein produce radially polarized light will be seen from an examination of FIGURE 4. Randomly oriented light indicated by the ray 25 is directed at the polarizing sheet 10 and passes first through either the low index material 12 or one or more of the flakes 11. If the ray 25 passes through a flake 11 which possesses a high refractive index, it will be bent towards the normal by the refraction of the flake. Thereafter the ray will emerge from the flake and enter the low index binding material 12 following which it will be bent away from the normal by the refraction of this layer. The ray will continue to be refracted on its way through the structure 10 until it emerges on the opposite side of the polarizer as highly polarized ray 26. That portion of the ray 25 which is not refracted through the polarizing structure 10 will be reflected as indicated at 27 and 28. Rays 27, 28 will emerge from the upper surface of the polarizing sheet 10 as light which is polarized in a direction normal to that of ray 26. This reflected light can be depolarized and re-directed towards the polarizing sheet or film 10 by a suitable reflector (not shown) in order to increase the amount of polarized light which eventually is transmitted by the polarizing structure 10. The reflected rays 27 and 28 may also emerge from the upper surface of the polarizing sheet 10 as depolarized light providing that the polarizing sheet 10 has been provided with a depolarizing surface 24, as shown in FIGURE 7.

To further illustrate the behaviour of light entering a polarizing sheet FIGURE 8 shows a transparent supporting medium 40 having an index of refraction of about 1.5 relative to air. Imbedded in the transparent medium 40 is a second high index transparent medium 41 having an index of refraction of about 2.25 relative to air, or a relative index of refraction of about 1.5 relative to the medium 40. Brewster's angle for medium 41, the high index medium, relative to the low index medium 40 is shown by the dashed line 29 which makes an angle of about 57° relative to the normal NN'.

However, the rays such as 43 and 48 entering from the air into the medium 40, are restricted after entrance to an angular range of approximately 0° to 40° to the normal NN'. These refracted rays are shown as 44 and 49.

After passing through the medium 41 at still a smaller internal angle 50, the rays 43 and 48 finally emerge as rays 46 and 51 respectively parallel to the rays 44 and 49. They then exit as rays 47 and 52 which are respectively parallel to the input rays 43 and 48.

It will be seen that the rays entering from the air interface are not able to approach the high index medium 41 at anything near Brewster's angle of about 57°, which is required for maximum polarizing efficiency. As a result, a structure having the characteristics shown in FIGURE 8 is not an efficient polarizer.

We have solved the problem of the restricted angular range of approach to the high index medium 41 within the medium 40 by providing irregular entrance and exit surfaces 70 and 71 on the supporting medium 40.

The effect of these surfaces is to permit any bundle of rays 60, 61 and 62 entering from the air to be further spread within the supporting medium 40, and to include the Brewster's angle indicated at 64. For example, rays 63 and 65 constitute a bundle of converging rays about the Brewster's angle as an axis. These rays proceed from a portion of the irregular surface 70.

The rays 63, 65 then impinge upon the high index medium 41 and follow the laws of refraction exiting from the lower surface parallel to the rays entering the upper surface of the medium 41.

Upon passing downward onto the irregular bottom or exit surface 71, a bundle of rays 72 is formed which exits as a ray bundle 73. The ray bundle 73 is polarized in a plane normal to the original plane of incidence upon the entrance surface 70.

The reflective components 30 are indicated in a few instances, but are not emphasized in order to avoid cluttering the diagram.

In those instances where total internal refraction occurs at surface 74, the light is redirected back through the mediums 41 and 40 and finally exits at least in part at the irregular entrance surface 70.

Owing to the extremely thin structure of the high index flake 41 and the supporting medium 40, and its low absorption characteristics, the light is transmitted through and polarized in a plane normal to its plane of initial incidence, or is reflected back.

Figure 9:
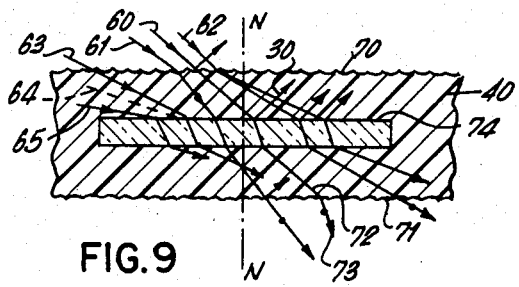
FIGURE 9 is a view similar to FIGURE 8 showing the effects of roughened entrance and exit surfaces upon the light rays.

The characteristics of the structure shown in FIGURE 9 is such as to permit polarization of the light transmitted therethrough.

The intensity and polarization percentage versus angle distribution pattern obtained in the transmitted polarized light does not have lobes which are quite as sharp, and characteristics of certain multilayer polarizers having plane surfaces only, nevertheless the distribution is very satisfactory for nonglare illumination purposes.

The surfaces 70 and 71, which are shown as irregular surfaces may be of the type known as diffusing surfaces, or they may be of a predetermined ripple design or predetermined prismatic or pyramidal design which may be embossed in known manner.

The polarizer shown in FIGURE 9 is a unitary sheet in that no air spaces are employed and the structure is extremely thin.

In lieu of the irregular outer surfaces referred to above it is possible to use refractive glass beads, such as the type used in connection with reflective signs. These beads usually have an index of refraction in excess of 2.1 and may be used advantageously by incorporating them within a supporting medium having an index of refraction of about 1.50. The effect of the structure is to obtain myriads of tiny spheres which act as lenses within a transparent medium having a relative index of refraction of approximately 1.50.

Figure 10:
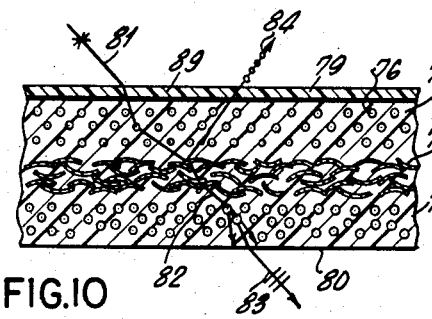
FIGURE 10 is a fragmentary cross-sectional view of a light polarizing panel, greatly enlarged showing the use of high index of refraction glass beads and high index of refraction glass flakes.
Figure 12:
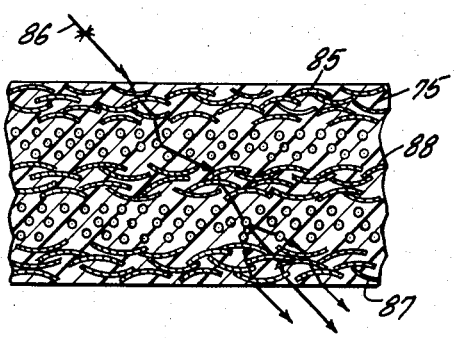
FIGURE 12 is a view similar to FIGURES 10 and 11 showing a further embodiment of the present invention.
Figure 13:
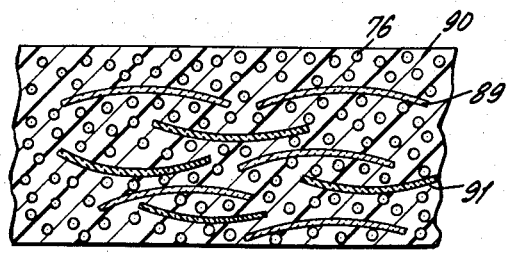
FIGURE 13 is a view similar to FIGURE 10 showing still another arrangement of glass beads and flakes embedded in a supporting medium.

Examples of multi-layer high index polarizing solid devices employing transparent high index beads, are shown in FIGURES 10, 12 and 13.

In FIGURE 10 there is shown a transparent suspending medium 75 containing a layer of glass beads 76, followed by a layer of high index flakes 77 disposed in parallel relationship and in sufficient number to substantially polarize light passing therethrough, and a second layer of high index refractive beads 78.

The advantage of utilizing the high index refractive beads is that the top and bottom surfaces 79 and 80 of the supporting medium 75 may be plane, not irregular.

The operation of the polarizer is illustrated by the ray 81 which is randomly vibrating, is unpolarized. The ray 81 enters the medium 75 and is refracted by passing through various beads 76. As a result, the ray 81 is scattered and forms a diverging pattern.

Some of the scattered rays are refracted and reflected by passage through the multi-layer high index flakes 77. These rays are shown as a typical ray 82.

After passing through the layers 77, the rays 82 are further scattered and after refraction by the beads 76 exit as the rays 83.

The rays 83 are polarized in a plane substantially normal to the plane of incidence and form a radial polarizing pattern. The reflected components 84 are polarized approximately parallel to the plane of incidence.

In FIGURE 12 there is shown a further modification employing glass beads. The medium 75 contains outer layers which have suspended therein low index flakes 85 which substantially match the index of refraction of the medium 75. That is, the medium 75 may have an index of refraction of 1.50 and the flakes 85 may have an index of refraction closely matching this index.

Therefore, an incident ray such as 86 will be refracted into the medium 75 and through the flakes 85 without suffering any additional refraction within the medium 75, because the flakes 85 and the medium form a continuous index of refraction phase, in which no refractions take place.

The purpose of including in the outer layers of the supporting medium 75 low index flakes 76 and 87 which match the index of refraction of medium 75 is to provide a sheet or panel having additional strength and rigidity due to the presence of a high percentage of glass flake in the structure. Also, the glass flake renders the finished article more impervious to moisture and resistant to weathering.

Refractive glass beads 76 and 78 are employed in layers as shown, the polarizer of FIGURE 12 for the same purpose as previously stated in FIGURE 10. An internal layer 88 comprising a sufficient number of layers of high index glass flakes for the purpose of polarizing the light passing therethrough is carried within the supporting medium 75 as a central polarizing layer.

The device in FIGURE 12 will function in the manner of the polarizer shown in FIGURE 10 in all other respects.

In FIGURE 10 there is also shown an additional layer 89 which may be a pressure-adhesion layer for the purpose of adhering the polarizer to other surfaces such as glass or plastic thereby adding to the rigidity of the thin structure shown in FIGURE 10.

The device shown in FIGURE 10 may require further support in the form of an additional transparent glass or plastic layer. In FIGURE 12 the device is self-supporting because of presence of the rigidifying outer layers provided by the additional matching index glass flakes 85, 87 in the outer layers.

Figure 11:
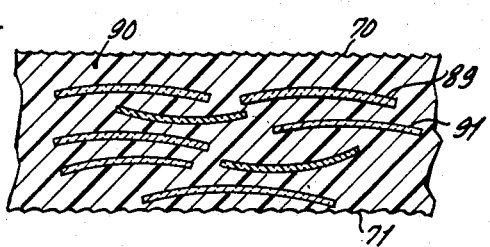
FIGURE 11 is a fragmentary cross-sectional view of a light polarizing panel greatly enlarged showing the use of high and low index of refraction glass flakes.

A further modification of a light polarizing sheet or panel employing glass bead is shown in FIGURE 11. This sheet consists of a mixture of a substantial quantity of low index glass flakes 89 which match the index of the supporting medium 90 and a smaller quantity of high index flakes 91 interspersed therein.

The purpose of the low flakes 89 is to add strength and rigidity to the sheet as well as aiding in its resistance to moisture and weathering.

The presence of parallel layers of a comparatively few layers of high index flakes 91 provides the structure with a reflective and refractive power capable of polarizing light.

The outer surfaces of the sheet shown in FIGURE 11 are shown with the rough surfaces 70 and 71, as previously described.

Alternatively we may utilize glass beads such as shown in FIGURE 10 within the outer layers of the structure.

It is even possible to intersperse the glass beads and the low index flakes and the high index flakes together, provided however that the glass beads have a diameter small enough so that they will not interfere with the parallelism of the flake glass structure, such a structure is shown in FIGURE 13.

The polarizing film 10 shown in FIGURE 1 can reflect from 25% up to 50% of the heat incident thereon as required because of the high reflectivity of the high index glass flake embedded therein, and thus contribute to the structure 13 to which it is applied, these heat reflecting characteristics, which is far more desirable than the present methods of reducing heat transmission which are employed in glass or such plastic light transmitting panel structures.

The polarizing film further provides an effective water vapor barrier which contributes to the improvement of the weathering characteristics of said plastic light transmitting panel structure 13 to which it is applied or incorporated. Since the glass flakes, embedded within the film, are of an inorganic material (glass) and since the flakes are disposed parallel and in layers throughout the film and since the film is incorporated or applied to the entire surface areas of said light transmitting plastic panel structure 13, the flakes reduce penetration into the panel 13 of water vapor which normally reduces the weatherability of said product.

In view of the foregoing it will be apparent that light polarizing structures have been provided which will produce a high percentage of polarization without scatter due to voids or air spaces and within a minimum thickness of structure.

The glass beads should be closely controlled as to number per unit volume diameter and relative index of refraction so as to provide not too little nor too much light divergence of the incident and exit rays but just sufficient to provide optimum transmission and polarization by reflection and refraction, about the internal Brewster's angle formed by the high index flakes in the low index support medium.

Having thus fully described the invention, what is claimed as new and desired to be secured by Letters Patent of the United States, is:

1. A structure for converting randomized light into radially polarized light comprising a film of transparent isotropic material having an index of refraction of at least 1.36 but not more than 1.5, a plurality of thin transparent glass flakes embedded within the film said flakes having an index of refraction of at least 2.21 and disposed in random orientation and parallel alignment with respect to each other and the plane of the film in the form of layers within the film and a plurality of small refractive glass beads having an index of refraction in excess of 2.1 within the film.

2. A structure for converting randomized light into radially polarized light comprising a film of transparent isotropic material having an index of refraction of at least 1.36 but not more than 1.5, a plurality of first thin transparent glass flakes embedded within the film said flakes having an index of refraction of at least 2.21 and a plurality of second thin transparent glass flakes embedded within the film said second glass flakes having an index of refraction equal to that of the film, said first and second glass flakes being disposed in random orientation and parallel alignment with respect to each other and the plane of the film in the form of layers within the film and an irregular entrance and exit surface on the said transparent film.

3. A structure for converting randomized light into radially polarized light comprising a film of transparent isotropic material having an index of refraction of at least 1.36 but not more than 1.5, a plurality of first thin transparent glass flakes embedded within the film said flakes having an index of refraction of at least 2.21 and a plurality of second thin transparent glass flakes embedded within the film said second glass flakes having an index of refraction equal to that of the film, said first and second glass flakes being disposed in random orientation and parallel alignment with respect to each other and the plane of the film in the form of layers within the film and a plurality of small refractive glass beads having an index of refraction in excess of 2.1 within the film.

References Cited in the file of this patent

UNITED STATES PATENTS

| | | |
|---|---|---|
| 2,270,323 | Land | Jan. 20, 1942 |
| 2,492,809 | Marks | Dec. 27, 1949 |
| 2,688,328 | Porter | Feb. 9, 1954 |
| 2,838,864 | Guida | June 17, 1958 |
| 2,887,566 | Marks | May 19, 1959 |
| 2,953,819 | Holonbek et al. | Sept. 27, 1960 |
| 2,981,980 | Brown et al. | May 2, 1961 |